Patented June 7, 1927.

1,631,858

UNITED STATES PATENT OFFICE.

SIMON GELFAND, OF BALTIMORE, MARYLAND.

PROCESS OF PREPARING A FOOD PRODUCT AND PRODUCT RESULTING THEREFROM.

No Drawing.   Application filed September 9, 1924. Serial No. 736,797.

This invention relates to the production of a new variety of food and it results in a new composition of matter characterized by a novel and appetizing flavor, a smooth and plastic consistency rendering it peculiarly adapted to use as a spread or filler for sandwiches and increased keeping qualities adapting it to convenient merchandising in containers not necessarily hermetically sealed.

The ingredients utilized in making the mayonnaise emulsion are intimately blended in flavor and the oil, yolk material, spices and acid elements emulsified, the resulting plastic composition being characterized by displaying upon analysis substantially 11.08% moisture; .54% ash; 81.68% fat; 1.38% protein; 5.32% carbohydrates; and having a caloric value per gram of 7.87 and in this emulsion the hereinafter referred to ingredients are incorporated.

The invention consists in beating the yolks of eggs, adding to the beaten yolks spices, as will hereinafter be enumerated, and then gradually adding oil, continuing the beating; then adding vinegar, continuing the beating thereby forming a mayonnaise emulsion; then adding finely chopped nuts as hereinafter more particularly specified, continuing the beating; then adding vegetables cured and finely chopped, as hereinafter specified, continuing the beating, and then adding ground roasted peanuts, also known as peanut butter, still continuing the beating until, as stated, an emulsified, substantially homogeneous, plastic product results having, as stated, a highly attractive and appetizing flavor of a distinctive character, improved keeping qualities, and a high food value.

A specific formula which has been found to be characteristic comprises egg yolks, 2.2%; spices, .4%; lemon juice, .2%; vinegar, .8%; water, .8%; oil, 15.6%; pickles, 39.9%; pickled cauliflower, 11.4%; pickled onions, 3.4%; cured pimientos, 2.3%; finely chopped almonds, 2%; finely chopped American or black walnuts, 1%; ground roasted peanuts, 20%.

In the above specific instance, the spices referred to are as follows: powdered mustard, 13%; powdered licorice, 2.1%; powdered ginger, 2.1%; powdered nutmegs, 2.1%; oil of cloves, .2%; cassia, .1%; white pepper, .1%; paprika, .1%; sugar, 80%; salt, .2%, of which mixture of spices it will be noted four percent of the resultant composition is used.

By beating into the egg yolks the spices, oil, vinegar, chopped nuts, chopped vegetables and ground peanuts in the order specified, it has been found that the emulsification and combination of the elements is more perfect and the specific flavor obtained better and also that the keeping qualities are improved.

Having thus described my invention, I claim:

1. An improved process for the manufacture of a food product consisting of dispersing roasted-peanut butter in an emulsion including edible oil, egg yolk, condiments and an aqueous liquid.

2. A new food product, including an emulsion of edible oil, yolk substance, condiments, edible acid and an aqueous liquid, in which is dispersed chopped nut meat.

3. A new food product, including an emulsion of edible oil, yolk substance, and condiments dispersed in aqueous liquid, and intermixed roasted-peanut butter.

4. A new food product, including an emulsion of edible oil, yolk substance, and condiments dispersed in aqueous liquid, in which is intermixed a nut butter.

In testimony whereof I affix my signature

SIMON GELFAND.